United States Patent [19]
Benamara

[11] Patent Number: 6,128,413
[45] Date of Patent: Oct. 3, 2000

[54] METHOD AND APPARATUS FOR DATA COMPRESSION

[75] Inventor: Ali Benamara, Nashua, N.H.

[73] Assignee: Agfa Corporation, Wilmington, Mass.

[21] Appl. No.: 08/985,200

[22] Filed: Dec. 4, 1997

[51] Int. Cl.[7] .................................................. G06K 9/42
[52] U.S. Cl. ........................................................ 382/251
[58] Field of Search .................................... 382/251, 250, 382/248, 236, 232, 253; 358/133

[56] References Cited

U.S. PATENT DOCUMENTS

| | | | |
|---|---|---|---|
| 5,128,756 | 7/1992 | Johnston et al. | 358/133 |
| 5,430,556 | 7/1995 | Ito | 358/427 |
| 5,541,653 | 7/1996 | Peters et al. | 348/264 |
| 5,592,569 | 1/1997 | Li | 382/253 |
| 5,699,457 | 12/1997 | Adar et al. | 382/239 |
| 5,764,805 | 6/1998 | Martucci et al. | 382/238 |
| 5,854,857 | 12/1998 | Queiroz et al. | 382/232 |

Primary Examiner—Leo H. Boudreau
Assistant Examiner—Paul H. Schirduan
Attorney, Agent, or Firm—Alfred A. Stadnicki

[57] ABSTRACT

A method and apparatus for compression of data using a technique for quantization and encoding referred to as Mapping through Interval Refinement (MIR). The method uses the size of the original data set together with a target compression ratio to determine the size of a compressed representative of the original data. The data elements after de-correlation are effectively sorted in decreasing order of significance and then written to an output data set using an efficient encoding method which incrementally refines the precision of elements already output. The output process continues until the target compressed file size is reached. Decompression of the compressed data is accomplished by reading in the sorted elements and restoring them to their locations in the data set, and to the precisions saved in the compression process. The method and apparatus employing it are applicable to time series data as well as multi-dimensional data such as color contone images used in the graphic arts electronic pre-press field.

51 Claims, 9 Drawing Sheets

| K | INITIAL | T=8 | T=4 | T=2 | T=1 |
|---|---------|-----|-----|-----|-----|
| 1 | 3       | 3   | 3   | ⓪   | 0   |
| 2 | 9       | ⓪   | 0   | 0   | 0   |
| 3 | -2      | -2  | -2  | ⓪   | 0   |
| 4 | 1       | 1   | 1   | 1   | ⓪   |
| 5 | -10     | ⓪   | 0   | 0   | 0   |
| 6 | 6       | 6   | ⓪   | 0   | 0   |

LIST OF COEFFICIENTS VS THRESHOLD T

FIG. 3A

| 1 | - | 9  | 9  | 9  | 9  |
|---|---|----|----|----|----|
| 2 | - | 10 | 10 | 10 | 10 |
| 3 | - | -  | 6  | 6  | 6  |
| 4 | - | -  | -  | 3  | 3  |
| 5 | - | -  | -  | 2  | 2  |
| 6 | - | -  | -  | -  | 1  |

LIST OF PREVIOUSLY FOUND ESSENTIAL COEFFICIENTS

FIG. 3B

|     | 1   | 1   | POS | 3   |
|-----|-----|-----|-----|-----|
| POS | 1   | 1   | POS |     |
| 2   | POS | NEG | 2   |     |
| NEG |     | 3   |     |     |
| 1   |     |     |     |     |

CODED MAP OF ESSENTIAL COEFFICIENTS

FIG. 3C

|   | 0 | 0 | 1 | - |
|---|---|---|---|---|
|   |   | 0 | 1 | 0 | - |
|   |   |   | 1 | 0 | - |
|   |   |   |   | 1 | - |
|   |   |   |   | 0 | - |
|   |   |   |   |   | - |

CODED LIST OF NEXT SIGNIFIGANT BITS

FIG. 3D

| K | INITIAL | T=8 | T=4 | T=2 | T=1 |
|---|---------|-----|-----|-----|-----|
| 1 | 0 | 0 | 0 | ②  | 3 |
| 2 | 0 | ⑧ | 8 | 8 | 9 |
| 3 | 0 | 0 | 0 | ⊝2 | -2 |
| 4 | 0 | 0 | 0 | 0 | ① |
| 5 | 0 | ⊝8 | -8 | -10 | -10 |
| 6 | 0 | 0 | ④ | 6 | 6 |

PRELIMINARY COEFFICIENTS VS THRESHOLD T

*FIG. 4A*

| | | | | | |
|---|---|---|---|---|---|
| 1 | 0 | 0 | 0 | 3 | 3 |
| 2 | 0 | 8 | 8 | 9 | 9 |
| 3 | 0 | 0 | 0 | -2 | -2 |
| 4 | 0 | 0 | 0 | 0 | 1 |
| 5 | 0 | -8 | -10 | -10 | -10 |
| 6 | 0 | 0 | 6 | 6 | 6 |

ADJUSTED COEFFICIENTS VS THRESHOLD T

*FIG. 4B*

METHOD AND APPARATUS FOR DATA COMPRESSION

BACKGROUND

The field of the present invention is the acquisition, transfer, processing and storage of digital data in graphic arts electronic pre-press applications, and in particular, the compression of such data by means of lossy data compression techniques.

The transfer and storage of data involves ever increasing bandwidth as the uses of electronic information continue to increase. Increased use of "real time" data requires maximum transfer rates with minimum data loss due to processing errors. Accordingly, interest in data compression has increased, both with respect to "lossless" data compression (in which excess data redundancy is eliminated without data loss) and to "lossy" compression, which not only removes redundant data but data judged to be "insignificant" according to criteria specific to the data application.

Although substantial progress has been made in development of lossless compression techniques, notably Shannon-Fano, Huffman and arithmetic coding, the amount of lossless compression possible in many applications is limited. For image compression, for example, a maximum compression ratio of 2:1 or less is typically realized.

Lossy data compression techniques are capable of substantially greater compression ratios in applications involving time series representations of analog signals (such as speech or music) and two-dimensional arrays representing images (still, motion or video), wherein a portion of the data can be thrown away without noticeable errors of reconstruction. Still further compression can be obtained for varying degrees of tolerance to detectable errors in reconstruction, again depending upon the application. The ability to trade off reconstruction accuracy against compression ratio (i.e., bandwidth) is one of the most attractive aspects of lossy compression for applications such as network data transfer, real-time data acquisition and processing, and storage of large data sets.

Image processing applications typical of those used in graphic arts electronic pre-press are particularly suitable for lossy data compression techniques, since in many cases the data sets are large (e.g., about 40 Mbytes for an RGB data set representing an 8'×10' image scanned at 400 dpi pixel resolution). Such images involve considerable redundancy and can be successfully compressed, using techniques such as the discrete cosine transform (DCT) as embodied in the JPEG standard, to ratios better than 10:1 without perceptual loss, and to 20:1 or better with tolerable losses.

Application of the discrete wavelet transform (also known as hierarchical decomposition) to image compression has also been widely studied, motivated by its ability to decompose an input signal into a series of successively lower resolution reference signals and their associated detail signals. Efficient image coding is then enabled by allocating bandwidth according to the relative importance of information in the lowest subband and detail signals. Such techniques are capable of results comparable to those of the DCT.

The success of such algorithms depends first upon the ability to de-correlate the original data in a reversible (i.e. lossless manner); second upon discarding data deemed "insignificant" according to pre-established criteria using a procedure hereinafter referred to as "quantization";

and, finally upon use of an efficient coding scheme to achieve the maximum bit rate for the data retained, at the same time achieving maximum accuracy of reconstruction. The nature of reconstruction errors (termed "visual artifacts" in the terminology of image processing) becomes a critical factor at the highest usable compression ratios. In the case of DCT-based algorithms, a noticeable "blocking" effect appears as a result of discontinuities between DCT boundaries. For wavelet-based algorithms, a "ringing" effect along edges can often be seen. Accordingly, the efficiency of the quantization and coding steps determines the point at which such artifacts first become objectionable, i.e. the "compressibility" of the image.

It is therefore a general object of the present invention to provide a method and apparatus for data compression.

It is a specific object of the invention to provide a method and apparatus for lossy compression of digital data involving quantization of de-correlated data and encoding at a minimum bit rate, such as to achieve the highest quality reconstruction for a pre-determined compressed data size.

It is another specific object of the invention to provide a method and apparatus for lossy compression of digital data comprising any sequence of numbers, representing time series data, multi-dimensional spatial array data, or a combination thereof.

It is still another specific object of the invention to increase the compressibility of images used in graphic arts electronic pre-press applications by increasing the compression ratios at which visual artifacts first become objectionable.

It is a feature of the invention that the method can be simply implemented.

It is another feature of the invention that coding of the bit stream can be embedded within the processing sequence associated with the method.

SUMMARY OF THE INVENTION

In the present invention, a new technique of quantization is employed, hereinafter referred to as Mapping through Interval Refinement (MIR). This method can be summarized as follows. First, the size of the original data set, together with a target compression ratio, is used to determine the size of a compressed data set representing the original data set, thereby determining a "bit budget" for the compressed data. The original data set is then de-correlated using a (reversible) transform such as the DCT or discrete wavelet transform, yielding a set of de-correlated coefficients. The size of this de-correlated data set is the same as that of the original data set.

Data compression occurs as a result of the quantization and encoding steps. In the MIR method of the invention, the de-correlated coefficients are sorted in reverse order of significance (from most significant to least significant), and then written to an output data set, using an efficient entropy encoding method which incrementally "refines" (i.e., increases the precision of) those coefficients already output. The process continues until the size of the output data set reaches the pre-determined bit budget. The method therefore assures that the maximum number and highest precision of coefficients are saved for a given output data set size, and that coefficients to be discarded are discarded beginning with the least significant and in increasing order of significance.

The reconstruction process is the reverse of that described above. The compressed data set is read in and the coefficients are restored to their proper locations in the data sequence, with zero values inserted for those coefficients discarded in the compression process. This set of coefficients is then transformed using the inverse transform corresponding to that used in the compression process.

The method can be applied to any sequence of numbers, representing time series data such as speech, music, etc., or two dimensional data such as image pixel data, given only that the entire data set is initially available for processing. Images processed by the method can be monochrome or color with an arbitrary number of color planes, each color being processed as an independent data set. They can be still images, motion pictures, or video images with data sets spanning both image pixel array dimensions and time.

Applications for the method include apparatus for data acquisition wherein data compression improves processing throughput and storage. In the graphic arts electronic pre-press field, these include digital scanners and digital cameras.

The method can also be used in apparatus for buffering of otherwise cumbersome datasets. In the graphic arts electronic pre-press field, these include image data stores such as CD-ROMs and disk buffers used for image processing prior to output to a printer or film recorder. Other applications include network transmission of speech, music or image data, including compressed video images.

Accordingly, one aspect of the invention is a method of compressing data comprising the step of determining a threshold value based on a first data value within an array of data values, such as an array of coefficients, derived from the data. The array of data values may be produced by de-correlating the data, for example by a discrete wavelet transform or a discrete cosine transform. The threshold value is preferably based on the largest absolute value within the array of data values and based on a logarithm thereof (i.e., the most significant digit in a number base) for example, a binary logarithm. The method further comprises the step of comparing a second data value having a location within the array of data value to threshold value. Several kinds of comparisons may be employed, depending on the data values, for example comparing the absolute values of signed numbers, or directly comparing the values of unsigned numbers.

If the second value is at least as great as the threshold value, then a data map is created based on the location, for example by appending the location to the end of the data map. The location may be an absolute index into the array or a relative index, that is run-length encoded, that includes the count of the number of data values with the array between the second data value and a successive data value that is at least as great as the threshold value. The run-length encoded index may be encoded in number base 4, i.e., with the symbols 0, 1, 2, and 3. Likewise, if the second value is at least as great as the threshold value, then a data list is created based on the second data value, for example, by appending a value that includes a number of significant digits of the second data value. Preferably, with signed data values, the appended value has the same sign as the second data value.

The method also comprises the step of compressing the data map and the data list, for example by an entropy encoding method such as arithmetic encoding. The compressed data map, the compressed data list, and the threshold value constitute the compressed data.

Another aspect of the invention is a method of decompressing data, in which the data includes a threshold value, a compressed data map, and a compressed data list. The decompression method comprises the step of decompressing, for example by an entropy decoding such as arithmetic decoding, the compressed data map to identify locations within an array of data values. A location may be an absolute index into the array or a relative index, that is run-length encoded, that includes the count of the number of data values with the array between the second data value and a successive data value that is at least as great as the threshold value. The run- length encoded index may be encoded in number base 4, i.e., with the symbols 0, 1, 2, and 3.

Preferably, if the data values are signed, then decompressing the data map also produces a plurality of signs for the corresponding locations.

A first data value at a position within the array of data values according to one of the plurality of locations is set to the threshold value preferably with the corresponding sign. The data list is decompressed to produce a plurality of second data values, one of which corresponds to the first data value, for updating the corresponding first data value, for example, by successively adding precision to the first data value. With signed data values, the second data values are absolute values. When the array of data values is populated, the array of data may be correlated, for example, by an inverse discrete wavelet transform or an inverse discrete cosine transform.

An apparatus for producing an encoded representation of a source image, comprises an imager configured to produce image data from a source image; and an encoder coupled to the image. The imager may comprise a scanner, a digital camera, a lens with an image detector for producing the image data of the source image focussed through the lens. The encoder includes a de-correlator for de-correlating the image data to produce an array of data values, for example by a discrete wavelet transform or discrete cosine transform; threshold logic for determining a threshold value based on a first data value within the array of data values, for example according to a binary logarithm of the largest absolute value in the array of data values; a comparator for comparing a second data value having a location within the array of data values to the threshold value; a data map generator for creating, e.g. by appending, a data map based on the location if the second data value is at least as the threshold value; a data list generator for creating, e.g. by appending, a data list based on the second data value if the second data value is at least as great as the threshold value; and a compressor, e.g. an entropy encoder such as an arithmetic encoder, for compressing the data map and the data list to produce the encoded representation of the source image.

A system for transmitting data across a network link comprising an encoder from compressing the data, a transmitter coupled to the encoder for transmitting the compressed data, a receiver for receiving a transmitted threshold value, a transmitted compressed data map and a transmitted compress data list, and a decoder for decompress coupled to the receiver. The encoder includes threshold logic for determining a threshold value based on a first data value within an array of data values based on the data; a comparator for comparing a second data value having a location within the array of data values to the threshold value; a data map generator for creating a data map based on the location if the second data value is at least as great as the threshold value; a data list generator for creating a data list based on the second data value location if the second data value is at least as great as the threshold value; and a compressor for compressing the data map and the data list into a compressed data map and a compressed data list, respectively.

The decoder is configured to decompress the transmitted compressed data map to produce a plurality of values representing locations within an array of data values; set a first data value at a position within the array of data values according to one of the plurality of locations to the transmitted threshold value; decompress the transmitted compressed data list to produce a plurality of second data values, one of the plurality of second data values corresponding to the first data value; and update the first data value based on the second data value.

BRIEF DESCRIPTION OF THE DRAWINGS

The objects and features of the invention will best be understood from a detailed description of the invention and a preferred embodiment thereof selected for the purposes of illustration and shown in the accompanying drawings in which:

FIG. 3A through FIG. 3D illustrate the use of the method of the invention to encode an example coefficient data set;

FIG. 4A and FIG. 4B illustrate the use of the method for reconstruction of the example coefficient data set of FIG. 3;

DETAILED DESCRIPTION OF THE INVENTION

Turning now to the drawings, the various embodiments of the invention will be described.

Figure 1:
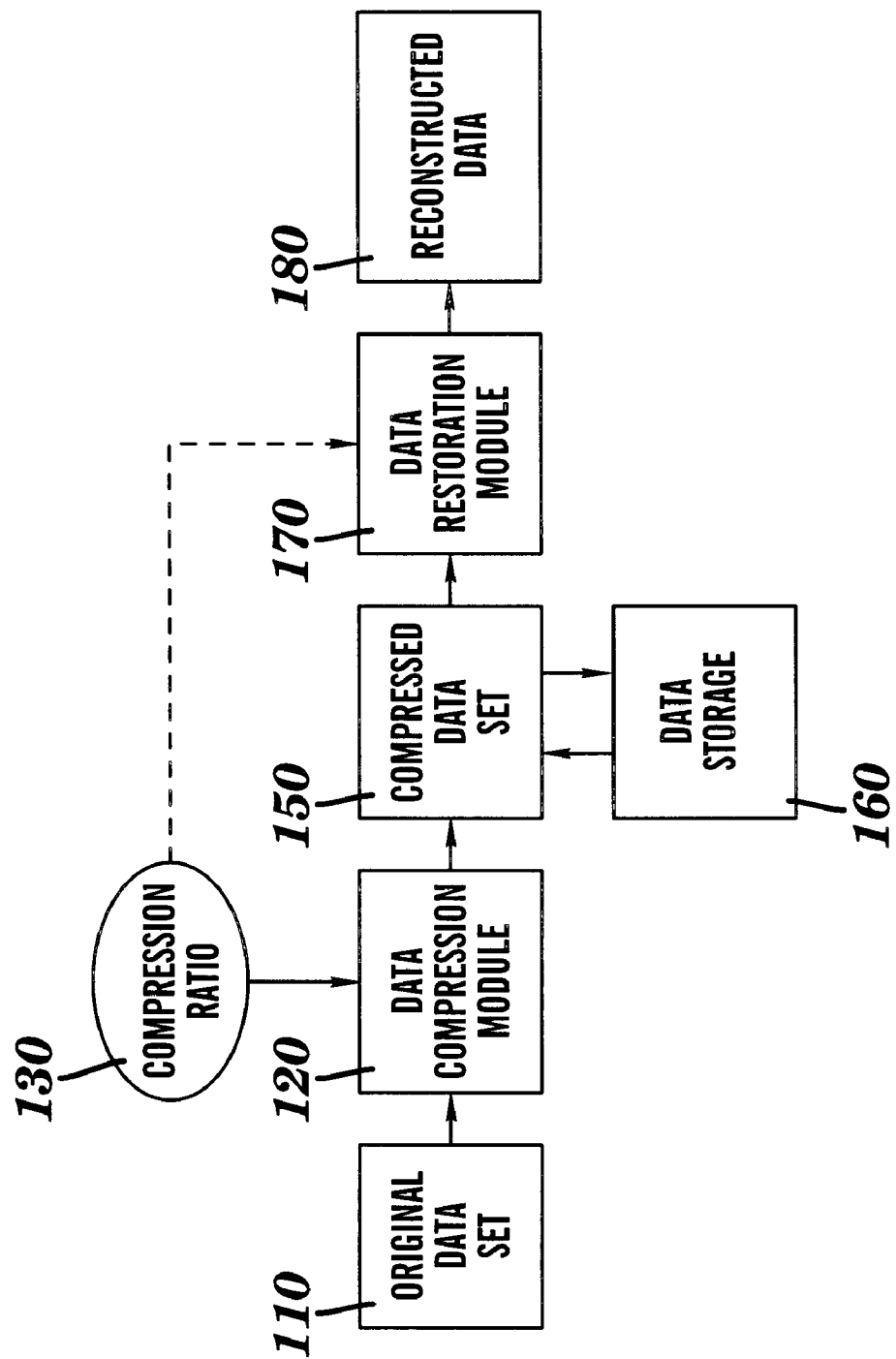
FIG. 1 shows an apparatus context diagram for application of the invention.

FIG. 1 shows the apparatus context for application of the invention. An original data set 110 is input to a data compression module 120, for compression with given compression ratio 130, yielding an compressed data set 150. The compressed data set 150 can be stored in data storage unit 160, or can be used immediately. For decompression, the compressed data set 150 is input to decompression module 170, together with compression ratio 130 previously used in the compression module 120, to obtain the reconstructed data set 180.

Figure 2:
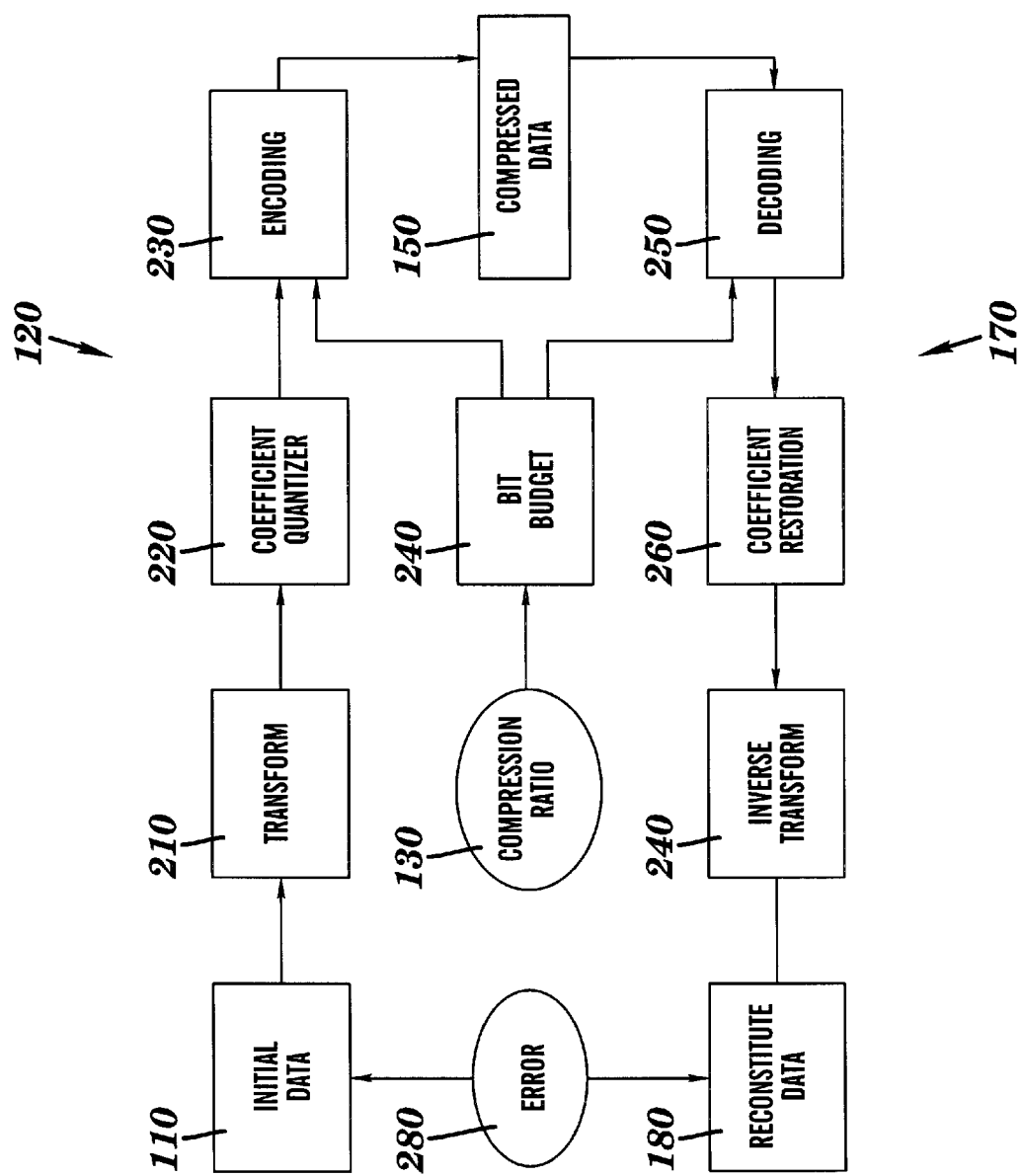
FIG. 2 shows a block diagram of the processing associated with application of the method of the invention to compression and decompression of data.

FIG. 2 provides a block diagram of the processing which takes place in the compression module 120 and decompression module 170 of FIG. 1. The original data set 110 is first de-correlated using a (reversible) transform such as the DCT or discrete-wavelet transform in transform module 210. The coefficients resulting from transform module 210 are quantized using the MIR technique of the invention in quantizer 220, using given target compression ratio 130 and the size of original data set 110 to determine a bit budget 240. The mapped, refined coefficients are encoded using an adaptive arithmetic entropy encoding module 230 until the bit budget 240 is reached, yielding the compressed data set 150. For reconstruction, the compressed data set 150 is decoded in decoder 250 using the same entropy coding algorithm as used in entropy encoding module 230 for the encoding process. The coefficients representing those from the transform module 210 are reconstructed in module 260. Finally, the inverse transform 270 is applied to the reconstructed coefficients to produce the reconstructed data set 180. The reconstruction error 280 is the mean square error (mse):

$$mse = \frac{1}{M}\sum_{k=1}^{M}(I(k) - I'(k))^2 \qquad (1)$$

where I(k) and I(k) are the original and reconstructed values for element k of the M-element ensemble of data.

Map of Essential Coefficients (MEC)

As used herein, each of the values v(k), k=1,2 . . . M resulting from the initial data transform (DCT or wavelet) is referred to as a coefficient. A coefficient is said to be essential with respect to a certain given threshold T if its absolute value exceeds or equals T. If $v_{max}$ is the magnitude of the coefficient having the largest absolute value, then an initial value for the threshold, $T_0$, is chosen as:

$$T_0 > v_{max}/B \qquad (2)$$

where $T_0$ is a power of B. Accordingly, $T_0$ corresponds to the most significant base B digit of $v_{max}$. For convenience, B is hereinafter assumed to be 2, since binary decisions can be efficiently implemented in computer systems using ORing, ANDing, and shifting operations. It will be clear to one skilled in the art that other choices of B can be used within the scope of the present invention.

Once the threshold value To is determined as described above, it is written to the output data set as header information, and quantization processing takes place as follows.

The MIR method generates, by scanning the array of coefficients v(k), k=1, 2, . . . M a list of symbols called the map of essential coefficients (MEC) to be coded to the output data set as previously described. The MEC identifies those coefficients found to be essential with respect to the working threshold T both as to location in the sequence, and to algebraic sign (positive or negative).

Run of Non-Essential Coefficients (RNEC)

In generating the MEC, several methods can be used for localizing the essential coefficients, including tagging each with an index, or counting and encoding the number of non-essential coefficients occurring between essential coefficients. In the embodiments described herein, the latter method is used. The algorithm sweeps sequentially through the coefficients, transmitting a sign-dependent symbol if a coefficient's magnitude is greater than or equal to-the-threshold T. These symbols are referred to as POS and NEG, respectively for positive or negative essential coefficients. If a coefficient is non-essential, the algorithm counts the run of non-essential coefficients (RNEC) until it encounters another essential coefficient.

Base Choice for RNEC

Given a sequence of data elements D(i), i=1, 2, . . . L, the objective of statistical coding, also known as entropy coding, is to transform the'sequence into another sequence, called the code sequence, such that the code sequence is shorter than the given sequence, and from which the original sequence can be recovered exactly. If we assume that the elements of D are statistically independent, the minimal length (in bits) of an optimally encoded code sequence is given by its total entropy in bits, H. where:

$$H = -\sum_{i=1}^{L} \log_2 p_D(i) \qquad (3)$$

where $p_D(i)$ is the probability of occurrence of the ith data symbol D(i). If the sequence is coded using a finite set of symbols S(j), j=1, 2, . . . N, hereinafter referred to as the symbol dictionary, equation (3) becomes:

$$H = -L\sum_{j=1}^{N} p_S(i)\log_2 p_S(i) \qquad (4)$$

where $P_S(j)$ is the probability (or relative frequency of occurrence) of the symbol in the symbol dictionary of N symbols. For a given data length L, the minimization of H to achieve compression requires maximizing the probability $p_S(j)$ of S(j) for given j. Viewed from an information theory point of view, a symbol with a high frequency of occurrence conveys less information, and therefore requires fewer bits for encoding.

The above discussion provides the rationale for the choice of number base for encoding the RNEC. For example, if the RNEC were encoded using number base 10, the dictionary would comprise the symbols POS, NEG and the digits 0, . . . , 9. The use of a base smaller than 10 increases the probabilities of occurrence of each of the digit symbols and therefore reduces the entropy per symbol. On the other hand, use of a smaller base also increases the length L of the sequence, partially offsetting the reduced entropy per symbol. In the preferred embodiment of the invention, the use of number base 4 was shown to provide optimum results yielding a symbol dictionary of six symbols, comprised of POS, NEG, and the digits 0, 1, 2, and 3. This choice is no coincidence, and well suited for computer base conversion since all we need are shift operations. Also it leads to a worst case value for H of about 2.58 bits per symbol if all symbols are equally probable. Use of arithmetic coding for the MEC provides near-optimal encoding, with bit rates typically within 5% of the above realized in tests using the preferred embodiment of the invention.

List of Previously-found Essential Coeffcients

As each essential coefficient is identified according to the procedure described previously, its absolute magnitude is added to a list of previously-found essential coefficients. The corresponding value in the original data set is then set to zero. The list of previously-found essential coefficients is maintained for the incremental refinement of precision of essential coefficients already found and mapped. It grows from most significant (with the initial Threshold value $T_S$) to least significant, and is coded for output as described below.

Output of Next Significant Bits

Following the arithmetic coding of the MEC list composed of POS, NEG, 0, 1, 2, 3, symbols, a binary list is generated representing the next significant bit for each of the coefficients found essential during the current MEC pass, and any previous MEC passes. The list is obtained using the logical AND of these coefficients with the new threshold, i.e, that corresponding to T/2. The list is then entropy coded with the symbol dictionary 0 and 1, achieving a bit rate of about 1 bit per symbol.

After completion of output of the MEC and output-of the current significant bits of the list of previously-found essential coefficients, the threshold T is halved and a new MEC pass is carried out. The process continues in this manner, bit by bit, until either the bit budget is reached, or the MEC pass for threshold value T=1 has been completed.

With each successive MEC pass, the number of essential coefficients using the mapping procedure is increased, and the number of bits of precision which are recorded for each essential coefficient previously saved is also increased. As mentioned previously, the algorithm effectively sorts the essential coefficients in decreasing order of significance and outputs them, along with the incrementally refined precision for those coefficients previously output until the desired output data size has been reached. It should also be noted that, if the bit budget is made large enough so that the procedure is allowed to continue through the T=1 MEC pass, all information present in Wt the original data set is recorded, and lossless reconstruction can be achieved (albeit without-compression).

Data Compression Processing Sequence

The processing steps involved in carrying out data compression according to the previous discussion is summarized as follows:

1. The original data set is de-correlated using a (reversible) transform such as the DCT or discrete wavelet transform;
2. An initial working threshold value $T_0$ is determined by the most significant bit of the absolute value of that coefficient having the greatest magnitude, and is written to the output data set as header information;
3. The de-correlated coefficients are scanned and compared to a given working threshold value, T;
4. Those coefficients exceeding the threshold T are localized as a map of essential coefficients (MEC) which is then converted to a set of symbols giving the sign of each essential coefficient and the run length of non-essential coefficients (RNEC) from one essential coefficient to the next, and entropy encoded using a symbol dictionary comprising the symbols POS, NEG and the digits 0, 1, 2, and 3;
5. For each of the essential coefficients of step 4, the absolute value is added to a growing list of previously-found essential coefficients, and the original data values corresponding to the newly found essential coefficients are set to zero;
6. The next significant bit (that corresponding to T/2) of each member of the list of previously-found essential coefficients is then entropy coded using a dictionary comprising the symbols 0, 1;
7. The threshold value T is divided by 2;
8. Steps 3. through 7. are repeated until a predetermined output data size (bit budget) is reached or until the threshold value T=1 has been processed; and,
9. When completed, a final end-of-coding symbol is written to the output data set.

Data Reconstruction Processing Sequence

The processing steps involved in reconstruction of data compressed according to the previous discussion is summarized as follows:

1. The initial value of the threshold $T_0$ is input from the header information written to the compressed data set, and the destination array, to which the reconstructed coefficients are to be restored, is initialized to zero values;

2. For a given working threshold value T, the compressed data stream is decoded symbol by symbol using the symbol dictionary comprised of the symbols POS, NEG and digits 0, 1, 2, and 3;

3. If POS or NEG is decoded, the corresponding destination value is identified as an essential coefficient with respect to T or 'd with the decoded bit, and set to plus or minus T respectively;

4. If the digits 0, 1, 2, or 3 are decoded, they are interpreted as the run of non-essential coefficients (RNEC), thereby locating the position in the destination array to which the next essential coefficient is to be restored;

5. After completion of the pass through the MEC, the compressed data stream is decoded symbol by symbol using the symbols 0 and 1 to determine the next significant bit of each essential coefficient already present in the map;

6. Each of the next significant bits determined in step 5 is ORed to the absolute value of the coefficients to which it corresponds, thereby adding a bit of precision to each previously decoded coefficient;

7. The threshold value T is divided by 2;

8. Steps 2 through 7 are completed until the end-of-coding symbol is read from the compressed data set; and, 9. The inverse transform corresponding to that used for de-correlation of the original data set is performed on the set of reconstructed coefficients, thereby yielding the reconstructed approximation of the original data set.

Numerical Example

FIG. 3A through FIG. 3D illustrate the use of the MIR quantization and encoding method for a given set of 6 coefficients. FIG. 4A and FIG. 4B illustrate the reconstruction of the same example set. The table of FIG. 3A shows the given set v(k), k=1, . . . , 6 as initial values in the leftmost column, with the same set after each successive MEC pass in adjacent columns beginning with initial threshold T=8 and continuing down to T=1. For each pass, the coefficients found to be essential are indicated in the drawing with surrounding circles.

As each essential coefficient is identified, its absolute magnitude is added to the list of previously-found essential coefficients shown in the corresponding column of the table of FIG. 3B. The table of FIG. 3C shows the symbols representing the MEC for each of the same MEC passes. The symbols of each column of the table are entropy encoded using the symbol dictionary with symbols POS, NEG, and the set. The inverse digits 0, 1, 2 and 3.

The table of FIG. 3D shows the list of next significant bits (corresponding to T/2) for the previously-found essential coefficients of FIG. 3B. These are entropy coded using the symbol 1s dictionary comprised of the symbols 0 and 1.

In the example, the total number of symbols encoded using the 6-symbol dictionary is 15, and the total number encoded using the 2-symbol 'dictionary is 10, for a total entropy of about 48 bits (6-bytes).

The reconstruction of the initial coefficients of FIG. 3A is illustrated in FIG. 4A and FIG. 4B. FIG. 4A shows the values inserted into the (initially zero) array of reconstructed values v'(k), k=1, . . . , 6 and after each successive MEC pass, beginning with threshold T=8 and continuing down to T=1. Each essential coefficient inserted is again shown in the drawing with a surrounding circle, and has a preliminary value of plus or minus T, depending upon which symbol, POS or NEG was decoded.

The table of FIG. 4B shows the adjusted coefficients at the end of each pass, after ORing the next significant bits decoded for the pass. After adjustment in the final (T=1) pass, the adjusted values v'(k) are fully reconstructed, and are identical to the initial set v(k) given in the table of FIG. 3A.

DESCRIPTION OF PREFERRED EMBODIMENTS

FIG. 5 through FIG. 8 illustrate embodiments of the invention as used in graphic arts electronic pre-press applications. In FIG. 5A, a color continuous tone image 510 is compressed to produce compressed image data file 512 having a file size determined by a previously specified compression ratio 514. In the example, the original image 510 is comprised of three color channels for red (R), green (G) and blue (B) color planes. Each pixel is therefore represented by three values of typically 8-bits each. Because the R, G and B color channels are not independent, they are (reversibly) transformed to the YIQ color space using RGB-YIQ module 516, which de-correlates the color-channel information, concentrating most of the information in the Y channel (to be discussed further below).

The YIQ representation 518 of the image 510 one color channel at a time as follows. The initial data is transformed using the discrete wavelet transform in DWT module 520 to yield the transform coefficients 522 (designated $Y^T$, $I^T$, and $Q^T$ for the channels Y, I and Q respectively). The coefficients 522 are quantized and encoded using the method of the invention in MIR encoder module 524, yielding the compressed coefficients $Y_C$, $I_C$ and $Q_C$ written to the output file 512. The given compression ratio 514 is used to determine the bit budget corresponding to each of the color channels Y, I and Q. Since most of the visual information is contained in the Y channel, the bit budgets are allocated according to the ratio 60%, 20% and 20% of the total file size determined from the compression ratio 514. The file 512 is comprised of a header 526 which includes the given compression ratio 514, the initial threshold values T for each of the three channels, and other information. The header 526 is followed by a data segment 528 containing the compressed data for each channel, with an end-of-coding mark 530 output by the MIR encoder module 524 when either the bit budget for the channel or threshold T=1 end conditions are met.

Figure 5A:
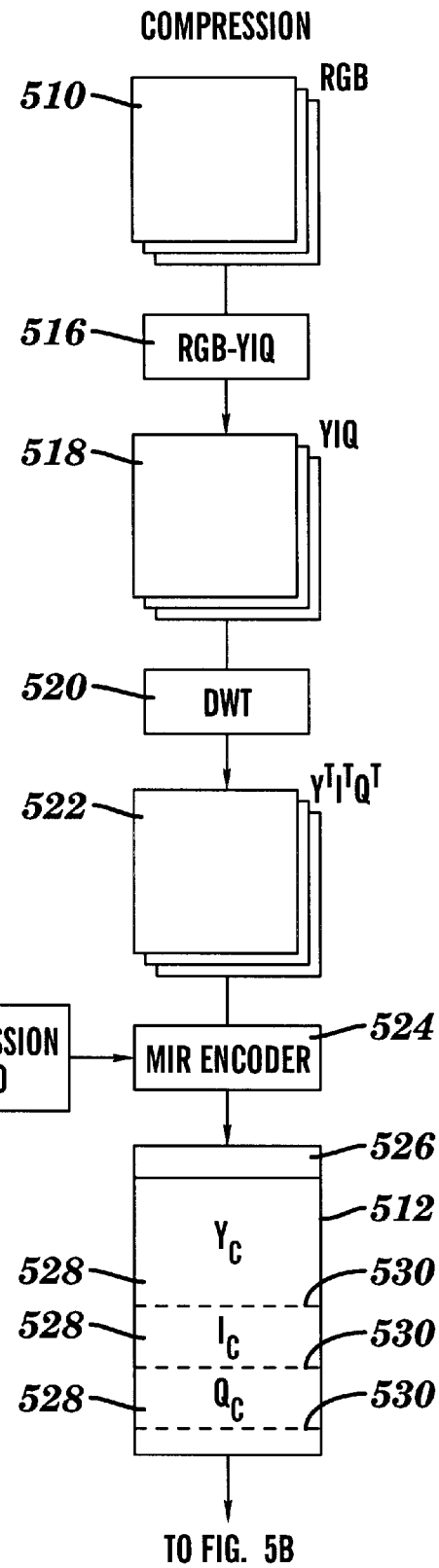
FIG. 5A and FIG. 5B illustrate a preferred embodiment of the method of the invention for compression of color contone images used in graphic arts electronic pre-press applications.
Figure 5B:
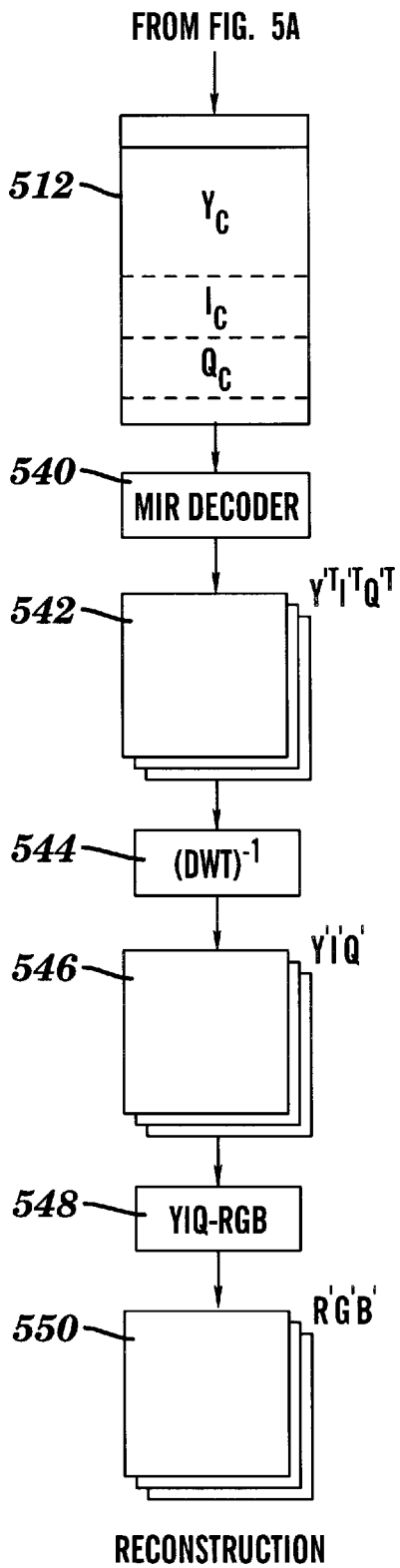

In FIG. 5B, the previously compressed file 512 is reconstructed using the method of the invention. The header 526 is read in and the compressed data for each channel $Y_C$, $I_C$ and $Q_C$ is input and decoded in MIR decoder 540, yielding the reconstructed coefficients 542 (designated in the drawing as $y'^T$, $I'^T$, and $Q'^T$ for the channels Y, I and Q respectively). The reconstructed coefficients 542 are then transformed using the inverse discrete wavelet transform 544 to yield the reconstructed color planes Y', I' and Q' 546 corresponding to those of the starting YIQ representation 518. Finally the reconstructed color planes 546 are converted from the YIQ color space to the RGB color space using YIQ-RGB transform module 548, to yield the reconstructed image 550. Of course, other color space, such as $YC_bC_r$, HSV, LAB, and the various CIE color spaces, could be used.

Figure 6:
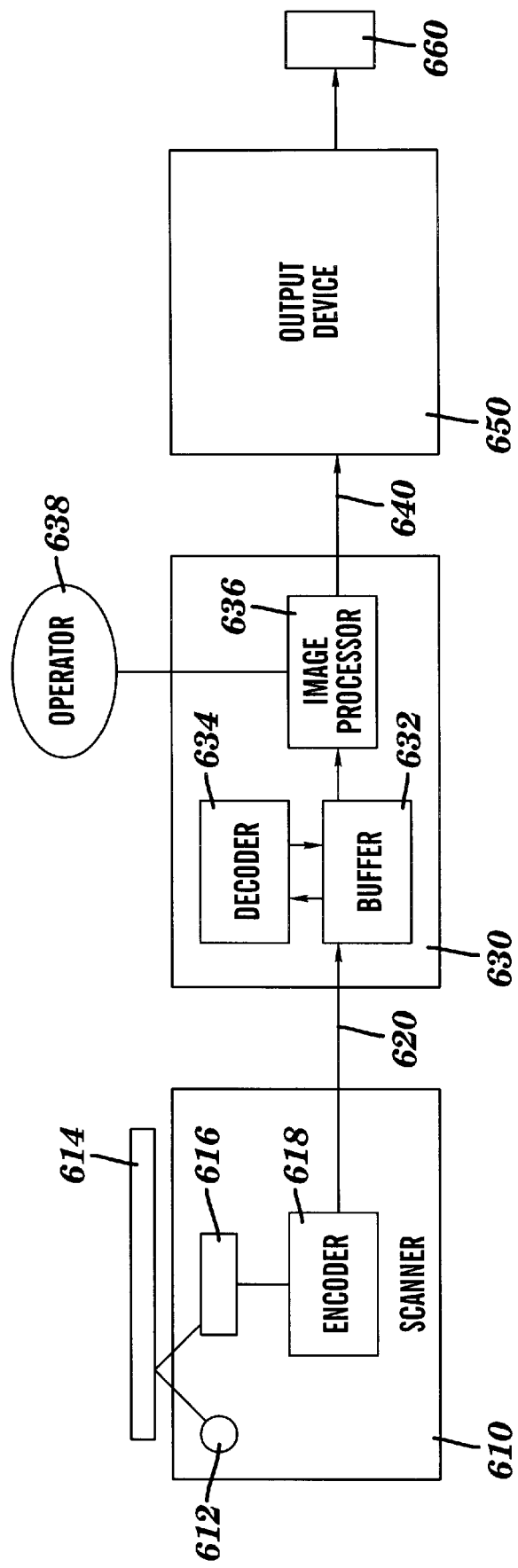
FIG. 6 shows an embodiment of the invention used with an image scanning apparatus and processing apparatus.

FIG. 6 shows an image scanning and processing apparatus, typical of those used in the field of graphic arts electronic pre-press, comprising a scanner 610, an image processing computer 630, and an output device 650 such as a printer or film recorder. In the scanner 610, a light source 612 is used to illuminate a source image 614, which can be monochrome or color, and can be comprised of any combination of continuous tone images (e.g., photographs), text, and line art. The illuminated source image 614 is scanned and recorded digitally using scanner/detector module 616 after which it is sent to encoder 618 for processing. The encoder 618 transforms the image data from scanner/detector 616 into a set of coefficients, which are then quantized and encoded according to the method of the invention described previously. The compressed data is transferred via link 620 to a receiving buffer 632 in computer 630. The data can be retained in compressed form in buffer 632 or reconstructed using decoder 634, which reverses the compression performed in encoder 618. After reconstruction, the image data can be processed in an image processing module 636 under control of an operator 638, to achieve color, contrast and other corrections. When ready for output, the data processed in image processing module 636 is sent via link 640 to output device 650 for output to hardcopy 660, typically comprised of paper, film or offset printing plate media.

Figure 7:
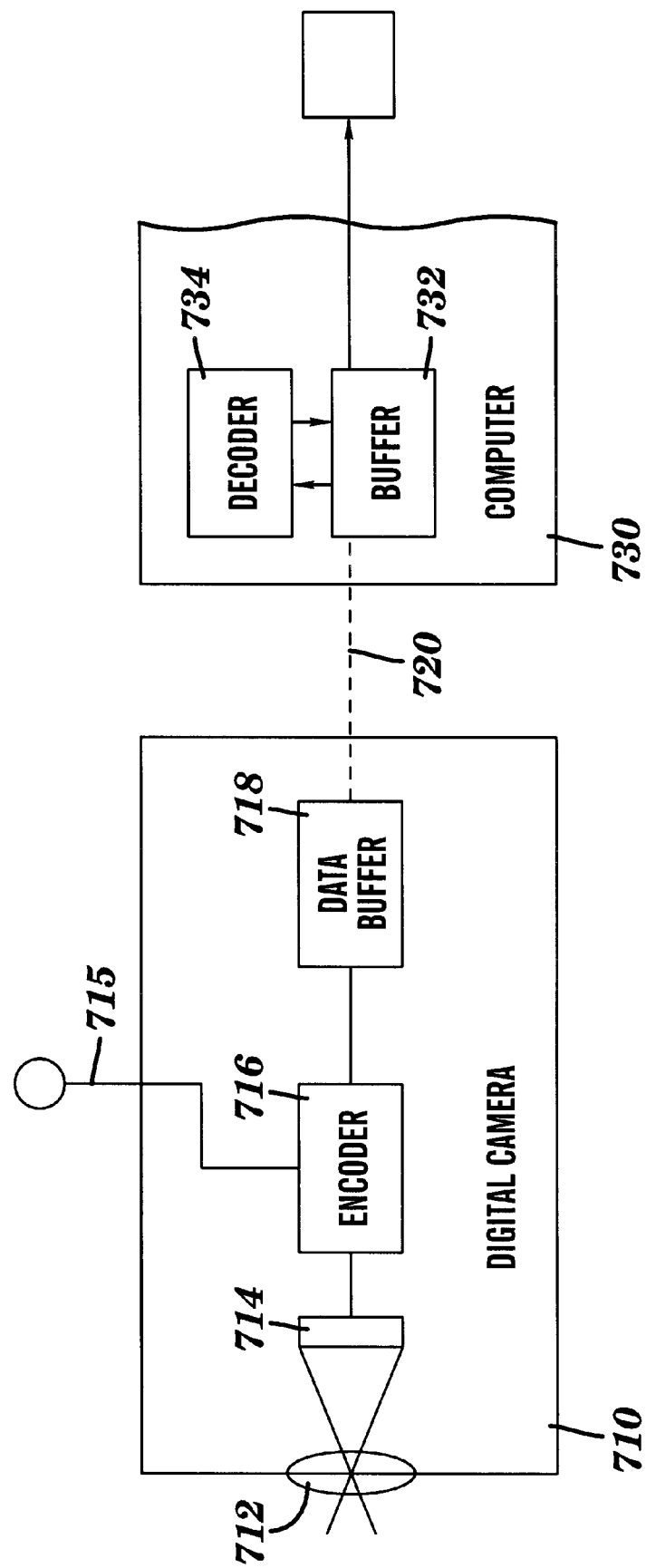
FIG. 7 shows an embodiment of the invention used with digital camera; and, FIG. 8 shows an embodiment of the invention used for efficient data transmission across a network.

FIG. 7 shows a digital camera system comprising a digital camera 710, which could be a still or moving image camera, such as a video camera containing a lens 712, image recording means 714, an encoder 716 and an internal data buffer 718. The image recording means 714 is typically a two-dimensional sensor array, but can also be comprised of single or linear sensor elements in combination with beam scanning means well known in the art for recording still or moving images. The data set from recording means 714 is encoded using encoder 716, transforming the image data into a set of coefficients which are then quantized and encoded according to the method of the invention as described previously. The compressed data is stored in data buffer 718 for later processing. The number of images which can be stored in data buffer 718, given the pixel resolution and dimensions of the recording means 714 is determined by the compression ratio specified for the encoder, i.e., the bit budget as described previously. For later transfer of images buffered in data buffer 718 to a processing computer 730, a temporary link 720 is used, and the received data stored in buffer 732 and decoded in decoder 734 as in the system of FIG. 6.

Figure 8:
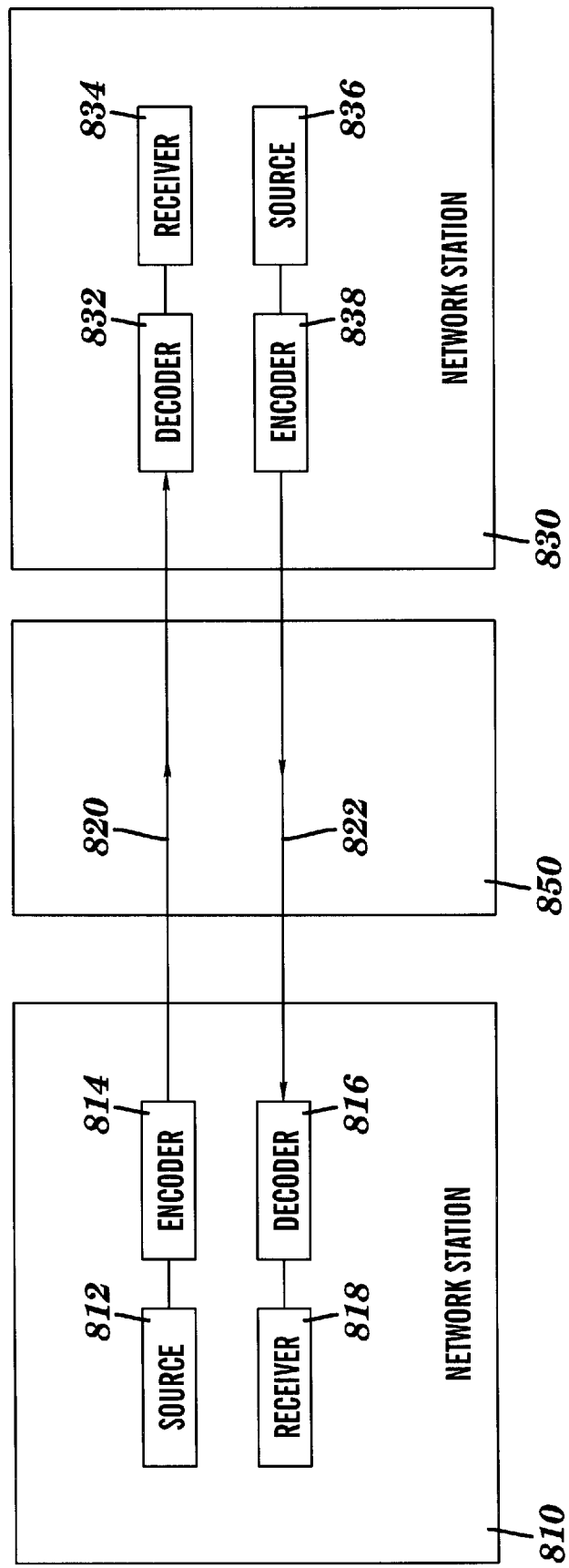

FIG. 8 illustrates an embodiment of the invention for efficient transfer of information across a network. In the drawing two network stations, designated as 810 and 830, are connected via network link 850. The network stations 810 and 830 can each be a workstation and/or a server, comprising one or more data sources from which data is sent and one or more receivers which use incoming data. Examples of this configuration include systems for bi-directional transmission of analog data such as "real-time" audio or video signals, and digital data such-as images.

In the example, network station 810 includes data source 812, which encodes the original data in encoder 814 according to the method of the invention as described previously and illustrated in the embodiments of FIG. 5 through FIG. 7. The encoded data is transferred via network link 850 along a data path 820 to network station 830, where it is reconstructed in decoder 832 and sent in reconstructed form to receiver 834. In similar fashion, source data 836 originating in network station 830 is encoded in encoder 838, transferred via network link 850 along a data path 822 to network station 810 wherein it is reconstructed in decoder 816 and sent to receiver 818. The effective bandwidth of the network link 850 is determined by the compressibility achieved in the encoding/decoding process without objectionable reconstruction errors.

The foregoing description of the present invention has been presented for purposes of illustration and description. It is not intended to be exhaustive or to limit the invention to the precise embodiments disclosed, and obviously many modifications and variations are possible in light of the above teaching. Such modifications and variations that may be apparent to a person skilled in the art are intended to be included within the scope of this invention as defined by the following claims.

What is claimed is:

1. A method of compressing data, comprising the steps of:
   (a) determining a threshold value based on a first data value within an array of data values based on the data;
   (b) comparing a second data value having a location within the array of data values to the threshold value;
   (c) if the second data value is at least as great as the threshold value, then (1) creating a data map based on the location of the second data valve and (2) creating a data list based on the second data value;
   (d) compressing the data map; and
   (e) compressing the data list.

2. The method of claim 1, wherein step (a) includes determining the threshold value according to a binary logarithm of the first data value.

3. The method of claim 1, wherein:
   step (a) includes the step of determining a threshold value based on the largest absolute value within the array of data values;
   step (b) includes companies the absolute value of the second value to the threshold value; and
   step (c) includes the step of if the absolute value of the second value is at least as great as the threshold value, then creating the data map based on the sign value and the location of the second and creating the data list based on the absolute value of the second value.

4. The method of claim 1, wherein step (d) includes arithmetic encoding the data map and the data list.

5. The method of claim 1, wherein:
   step (c)(1) includes (c)(3) appending the location to the end of a data map; and
   step (c)(2) includes (c)(4) adding the second value to the end of a data list.

6. The method of claim 5, wherein step (c)(3) includes (c)(5) counting the number of data values within the array of data values between the second data value and a successive data value that is at least as great as the threshold value.

7. The method of claim 6, wherein step (c)(5) includes encoding the number in base 4.

8. The method of claim 1, further comprising (f) de-correlating the data to produce the array of data values.

9. The method of claim 8, wherein step (f) includes performing a discrete wavelet transform upon the data to produce the array of data values.

10. The method of claim 8, wherein step (f) includes performing a cosine transform
    upon the data to produce the array of data values.

11. The method of claim 1, wherein:
    said array of data values has a sequence; and
    the sequence represents one of a time relationship, and a spatial relationship of the data values with respect to each other.

12. The method of claim 11, wherein the data values correspond to one of a plurality of channels.

13. The method of claim 12, wherein the one channel is a color channel.

14. A method of decompressing data, having a threshold value, a compressed data map, and a compressed data list, said method comprising the steps of:
   (a) decompressing the compressed data map to produce a value that expresses a location within an array of data values;
   (b) setting a first data value, at the location within the array of data values, according to the threshold value;
   (c) decompressing the compressed data list to produce a plurality of second data values, one of the plurality of second data values corresponding to the first data value; and
   (d) updating the first data value based on the plurality of second data values.

15. The method of claim 14, wherein:
   step (a) includes entropy decoding the compressed data map; and
   step (c) includes entropy decoding the compressed data list.

16. The method of claim 14, wherein:
   step (a) includes decompressing the compressed data map to identify a sign value;
   step (b) includes setting the first data value so as to have the same sign value; and
   step (c) includes decompressing the compressed data list to produce an absolute value corresponding to the first data value.

17. The method of claim 14, wherein step (c) includes determining the location based on a number of data values within the array of data values between the first data value and another data value.

18. The method of claim 17, wherein determining the location includes decoding the number of data values in base 4.

19. The method of claim 14, further comprising:
   (e) repeating steps (b) and (d) to populate the array of data values; and
   (f) correlating the populated array of data values.

20. The method of claim 19, wherein step (f) includes performing an inverse discrete wavelet transform upon the array of data values.

21. The method of claim 19, wherein step (f) includes performing an inverse discrete cosine transform upon the array of data values.

22. An apparatus for producing an encoded representation of a source image, comprising:
   an imager configured to produce image data from a source image; and
   an encoder coupled to the imager, including:
   a de-correlator for de-correlating the image data to produce an array of data values;
   threshold logic for determining a threshold value based on a first data value within the array of data values;
   a comparator for comparing a second data value having a location within the array of data values to the threshold value;
   a data map generator for creating a data map based on the location if the second data value is at least as great as the threshold value;
   a data list generator for creating a data list based on the second data value if the second data value is at least as great as the threshold value; and
   a compressor for compressing the data map and the data list to produce the encoded representation of the source image.

23. The apparatus of claim 22, wherein the source image is one of a plurality of source images.

24. The apparatus of claim 23, wherein the plurality of sources images are separated from each other by time.

25. The apparatus of claim 23, wherein the plurality of source images includes multiple color channels.

26. The apparatus of claim 22, wherein the de-correlator includes a de-correlator for de-correlating a two-dimensional array of pixels, having a plurality of data channels in a color space.

27. The apparatus according to claim 26, wherein the plurality of data channels are three data channels.

28. The apparatus according to claim 26, wherein the color space is one of a YIQ color space.

29. The apparatus of claim 22, wherein the de-correlator includes a discrete wavelet transform de-correlator.

30. The apparatus of claim 22, wherein the threshold logic includes logic for determining the threshold value according to a binary logarithm of the first data value.

31. The apparatus of claim 22, wherein the data map generator is configured to:
   count a number of data values within the array of data values between the second data value and a successive data value that is at least as great as the threshold value;
   encode the number of data values as a base 4 number; and
   add the base 4 number to the end of the data map.

32. The apparatus of claim 22, wherein the compressor includes an entropy encoder.

33. The apparatus of claim 22, wherein the imager comprises a scanner.

34. The apparatus of claim 22, wherein the imager comprises:
   a lens; and
   an image detector for producing the image data of the source image focused through the lens.

35. A system for transmitting data across a network link, comprising:
   an encoder for compressing the data, including:
   threshold logic for determining a threshold value based on a first data value within an array of data values based on the data;
   a comparator for comparing a second data value having a location within the array of data values to the threshold value;
   a data map generator for creating a data map based on the location if the second data value is at least as great as the threshold value;
   a data list generator for creating a data list based on the second data value location if the second data value is at least as great as the threshold value; and
   a compressor for compressing the data map and the data list into a compressed data map and a compressed data list, respectively;
   a transmitter coupled to the encoder for transmitting the threshold value, the compressed data map, and the compressed data list via the network link;
   a receiver for receiving a transmitted threshold value, a transmitted compressed data map, and a transmitted compressed data list via the network link;
   a decoder coupled to the receiver and configured to:
   decompress the transmitted compressed data map to produce a plurality of values representing locations within an array of data values;

set a first data value at a position within the array of data values according to one of the plurality of locations to the transmitted threshold value;

decompress the transmitted compressed data list to produce a plurality of second data values, one of the plurality of second data values corresponding to the first data value; and update the first data value based on the second data value.

36. The system of claim 3 5, wherein the threshold logic is configured to determine the threshold value according to a binary logarithm of the first data value.

37. The system of claim 35, wherein:

the threshold logic is configured to determine a threshold value based on the largest absolute value within the array of data values;

the comparator is configured to compare the absolute value of the second value to the threshold value; and the data map generator is configured to create the data map based on the sign and the location of the second value if the absolute value of the second value is at least as great as the threshold value; and the data list generator is configured to create the data list based on the absolute value of the second value if the absolute value of the second value is at least as great as the threshold value.

38. The system of claim 35, wherein the compressor includes an arithmetic encoder.

39. The system of claim 35, wherein:

the data map generator is configured to append the location to the data map; and the data list generator is configured to append the second value to the data list.

40. The system of claim 39, wherein the data map generator is configured to count the number of data values within the array of data values between the second data value and a successive data value that is at least as great as the threshold value.

41. The system of claim 40, wherein the data map generator is configured to encode the number in base 4.

42. The system of claim 35, wherein the encoder further includes a de-correlator for de-correlating the data to produce the array of data values.

43. The system of claim 42, wherein the de-correlator is configured to perform a discrete wavelet transform upon the data to produce the array of data values.

44. The system of claim 42, wherein the de-correlator is configured to perform a discrete cosine transform upon the data to produce the array of data values.

45. The system of claim 35, wherein the decoder is configured to entropy decode the transmitted compressed data map and the transmitted compressed data list.

46. The system of claim 35, wherein the decoder is configured to:

decompress the transmitted compressed data map to produce a second value expressing a sign;

set the first data value to have the same sign as the second value; and decompress the transmitted compressed data list to produce an absolute value corresponding to the first data value.

47. The system of claim 35, wherein the decoder is configured to determine the position based on a number of data values within the array of data values between the first data value and another data value.

48. The system of claim 47, wherein the decoder is configured to decode the number of data values in base 4.

49. The system of claim 35, wherein the decoder is configured to re-correlate the array of data values.

50. The system of claim 49, wherein the decoder is configured to perform an inverse discrete wavelet transform upon the array of data values.

51. The system of claim 49, wherein the decoder is configured to perform an inverse discrete cosine transform upon the array of data values.

* * * * *